United States Patent
Chang et al.

(10) Patent No.: US 11,012,739 B2
(45) Date of Patent: May 18, 2021

(54) METHOD AND DEVICE FOR RECOGNIZING CONTENT

(71) Applicant: SAMSUNG ELECTRONICS CO., LTD., Suwon-si (KR)

(72) Inventors: Tae-kwon Chang, Seoul (KR); Sang-ha Kim, Seoul (KR); Sung-jin Kim, Yongin-si (KR); Il-koo Kim, Seongnam-si (KR); Sung-kweon Park, Suwon-si (KR); Young-o Park, Seoul (KR); Won-young Jang, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 269 days.

(21) Appl. No.: 16/084,030

(22) PCT Filed: Mar. 14, 2017

(86) PCT No.: PCT/KR2017/002752
§ 371 (c)(1),
(2) Date: Sep. 11, 2018

(87) PCT Pub. No.: WO2017/160062
PCT Pub. Date: Sep. 21, 2017

(65) Prior Publication Data
US 2020/0296450 A1    Sep. 17, 2020

(30) Foreign Application Priority Data
Mar. 16, 2016    (KR) ........................ 10-2016-0031690

(51) Int. Cl.
*H04N 21/44*    (2011.01)
*H04N 21/431*    (2011.01)
(Continued)

(52) U.S. Cl.
CPC ... *H04N 21/44008* (2013.01); *H04N 21/4314* (2013.01); *H04N 21/4316* (2013.01)

(58) Field of Classification Search
CPC .......... H04N 21/44008; H04N 21/4314; H04N 21/4316; H04N 21/23418; H04N 21/812; H04N 5/2723
See application file for complete search history.

(56) References Cited

U.S. PATENT DOCUMENTS

| | | |
|---|---|---|
| 8,955,005 B2 | 2/2015 | Gava et al. |
| 9,132,596 B2 | 9/2015 | Wedekind |

(Continued)

FOREIGN PATENT DOCUMENTS

| | | |
|---|---|---|
| CN | 1409237 | 4/2003 |
| CN | 102065572 | 5/2011 |

(Continued)

OTHER PUBLICATIONS

Extended Search Report dated Nov. 7, 2018 in counterpart European Patent Application No. 17766963.7.

(Continued)

*Primary Examiner* — Alexander Gee
(74) *Attorney, Agent, or Firm* — Nixon & Vanderhye, P.C.

(57) ABSTRACT

Provided is a method, performed by a device, of recognizing content, the method including selecting a template to be used for recognizing content displayed on the device when a type of a content service that provides the content to the device is determined; capturing a screen of the device when a control signal is received by the device; determining whether the captured screen corresponds to a gateway page; determining whether the captured screen corresponds to the selected template when the captured screen corresponds to the gateway page; and generating a template corresponding (Continued)

to the content service, based on the captured screen, when the captured screen does not correspond to the selected template.

15 Claims, 11 Drawing Sheets

(51) Int. Cl.
*H04N 21/25* (2011.01)
*G06K 9/32* (2006.01)
*G06Q 30/02* (2012.01)
*H04N 5/445* (2011.01)
*H04N 21/258* (2011.01)

(56) References Cited

U.S. PATENT DOCUMENTS

| | | | |
|---|---|---|---|
| 9,756,381 B2 | 9/2017 | Oh et al. | |
| 2008/0098357 A1 | 4/2008 | Candelore | |
| 2008/0127253 A1 | 5/2008 | Zhang et al. | |
| 2011/0316671 A1* | 12/2011 | Yaguchi | H04N 21/6582 340/5.83 |
| 2012/0020518 A1* | 1/2012 | Taguchi | G06T 7/292 382/103 |
| 2014/0282668 A1* | 9/2014 | Gava | H04N 21/44008 725/19 |
| 2014/0349750 A1* | 11/2014 | Thompson | A63F 13/537 463/31 |
| 2015/0120839 A1* | 4/2015 | Kannan | H04N 21/812 709/206 |
| 2015/0271548 A1 | 9/2015 | Daub | |
| 2015/0334459 A1 | 11/2015 | Oh et al. | |
| 2016/0062956 A1 | 3/2016 | Gotman et al. | |

FOREIGN PATENT DOCUMENTS

| | | |
|---|---|---|
| CN | 104471951 | 3/2015 |
| CN | 105144175 | 12/2015 |
| CN | 105279525 | 1/2016 |
| KR | 10-2014-0001007 | 1/2014 |
| KR | 10-2014-0040126 | 4/2014 |
| KR | 10-2014-0064165 | 5/2014 |
| KR | 10-2014-0113286 | 9/2014 |
| KR | 10-2015-0035582 | 4/2015 |

OTHER PUBLICATIONS

Chattopadhyay, T et al, "TV Video Context Extraction", TENCON 2011-2011 IEEE Region 10 Conference, IEEE, Nov. 21, 2011, pp. 216-220, XP032092491.

Pal, Arpan et al, "Context-aware television-internet mash-ups logo detection and character recognition", Pattern Analysis and Applications, Springer, New York, NY, US, vol. 18, No. 1, Nov. 6, 2014, pp. 191-205, XP035427299.

Manwatkar, Pratik Madhukar et al, "A Technical Review on Text Recognition from Images," 2015 IEEE 9th International Conference on Intelligent Systems and Control, IEEE, Jan. 9, 2015, pp. 1-5, XP033219527.

Search Report dated Jul. 5, 2017 in counterpart International Patent Application No. PCT/KR2017/002752 and English-language translation.

Written Opinion dated Jul. 5, 2017 in counterpart International Patent Application No. PCT/KR2017/002752 and English-language translation.

First Office Action dated Mar. 27, 2020 in counterpart Chinese Patent Application No. 201780017466.4 and English-language machine translation.

* cited by examiner

METHOD AND DEVICE FOR RECOGNIZING CONTENT

This application is the U.S. national phase of International Application No. PCT/KR2017/002752 filed 14 Mar. 2017, which designated the U.S. and claims priority to KR Patent Application No. 10-2016-0031690 filed 16 Mar. 2016, the entire contents of each of which are hereby incorporated by reference.

TECHNICAL FIELD

The present disclosure relates to a method, performed by a device, of identifying content, a method, performed by a server, of identifying content, a device for identifying content, and a server for identifying content.

BACKGROUND ART

To provide an advertisement customized to meet the needs of various consumers, an advertisement provider needs to know what content a user is consuming.

A fingerprint-based content recognition technology according to the related art extracts a video or audio fingerprint from content currently being reproduced by a display device such as a TV, transmits the extracted fingerprint to a server, and matches the transmitted fingerprint with reference data of a database of the server to recognize content. Based on these results, it is possible to analyze the content consumption or the viewing pattern of the display device, and an advertiser may effectively provide a customized advertisement based on a result of the analysis.

However, the fingerprint-based content recognition technology causes, for the display device, additional computation or a data transfer load during a process of extracting the fingerprint from the displayed content and transmitting the fingerprint to the server, as well as a large economical load due to additional hardware, such as a need to operate a separate database server and a matching server. Accordingly, a need has arisen for a technology capable of quickly and easily detecting information about content being reproduced by the display device.

DESCRIPTION OF EMBODIMENTS

Technical Problem

Provided are a method of controlling a device for providing content capable of more efficiently acquiring information of content being viewed by a user of the device, by acquiring the information of the content being viewed by the user through a captured screenshot of the device, the device, and a server.

Solution to Problem

According to an aspect of the present disclosure, a method of recognizing content by a device includes selecting a template to be used for recognizing content displayed on the device when the type of a content service that provides the content to the device is determined; capturing a screen of the device when a control signal is received by the device; determining whether the captured screen corresponds to a gateway page; determining whether the captured screen corresponds to the selected template when the captured screen corresponds to the gateway page; and generating a template corresponding to the content service on the basis of the captured screen when the captured screen does not correspond to the selected template.

BEST MODE

Figure 1:
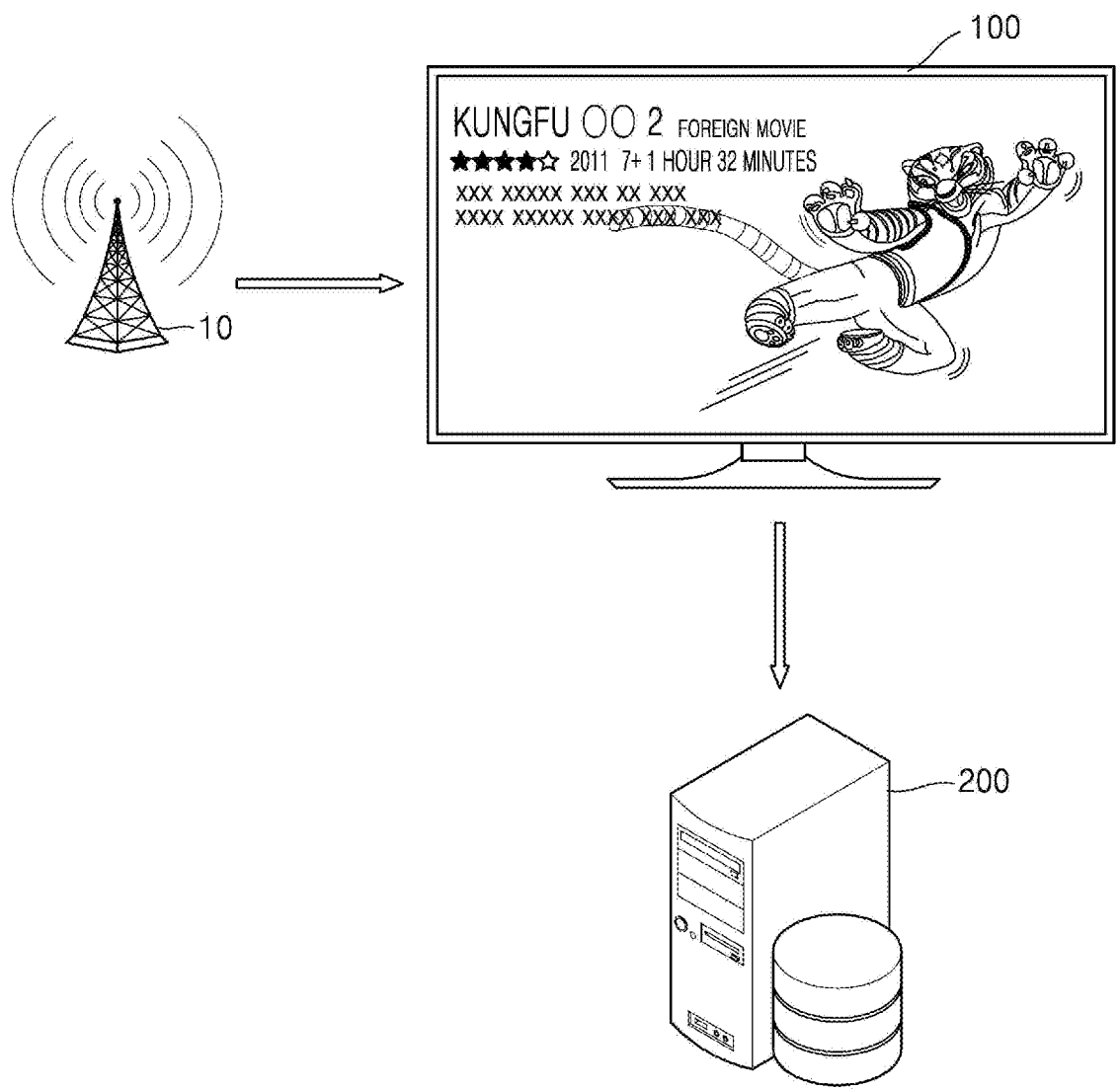
FIG. 1 is a conceptual diagram for explaining a device for recognizing content, according to an embodiment.

According to an aspect of the present disclosure, a method of recognizing content by a device includes selecting a template to be used for recognizing a content displayed on the device when the type of a content service that provides a content to the device is determined; capturing a screen of the device when a control signal is received by the device; determining whether the captured screen corresponds to a gateway page; determining whether the captured screen corresponds to the selected template when the captured screen corresponds to the gateway page; and generating a template corresponding to the content service on the basis of the captured screen when the captured screen does not correspond to the selected template.

The method may further include capturing a screen of the device in a predetermined time unit from a time when the control signal is received.

The method may further include comparing a plurality of screens and selecting a screen satisfying a predetermined condition as a screen corresponding to the gateway page from among the plurality of screens.

The generating of the template may include recognizing a layout of components included in the captured screen, wherein the template displays default components corresponding to the components based on the recognized layout.

The generating of the template may include recognizing a text region on the captured screen, wherein the template includes information about a position of the recognized text region and an arrangement.

The method may further include: determining the type of the content service providing the content, wherein the selecting of the template includes: when a template corresponding to the type of the content service is not stored in the device, selecting a predetermined basic template as the template corresponding to the type of the content service.

The method may further include: detecting a text region from the captured screen by using the generated template; and recognizing content displayed on a screen of the device, based on text detected from the detected text region.

The method may further include: detecting text determined as content recognition information from the detected text by comparing the detected text and at least one text included in a predetermined meaning recognition model.

The method may further include: updating the template based on a position of the text determined as the content recognition information and displayed on the captured screen.

According to another aspect of the present disclosure, a device includes: a display configured to display content provided from a content service; an input unit configured to receive a control signal for controlling the content provided from the content service; and a controller configured to select a template used for recognizing the content displayed on the device when a type of the content service that provides the content to the device is determined, determine whether a captured screen corresponds to a gateway page including content recognition information when the control signal is received by the device, determining whether the captured screen corresponds to the selected template when the captured screen corresponds to the gateway page, and generate a template corresponding to the content service based on the captured screen when the captured screen does not correspond to the gateway page.

The controller may be configured to capture a screen of the device in a predetermined time unit from a time when the control signal is received.

The controller may be configured to compare a plurality of screens and select a screen satisfying a predetermined condition as a screen corresponding to the gateway page from among the plurality of screens.

The controller may be further configured to recognize a layout of components included in the captured screen, wherein the template displays default components corresponding to the components based on the recognized layout.

The controller may be further configured to recognize a text region on the captured screen, wherein the template includes information about a position of the recognized text region and an arrangement.

The controller may be further configured to determine the type of the content service providing the content, and, when a template corresponding to the type of the content service is not stored in the device, select a predetermined basic template as the template corresponding to the type of the content service.

The controller may be further configured to detect a text region from the captured screen by using the generated template and recognize content displayed on a screen of the device, based on text detected from the detected text region.

The controller may be further configured to detect text determined as content recognition information from the detected text by comparing the detected text and at least one text included in a predetermined meaning recognition model.

The controller may be further configured to update the template based on a position of the text determined as the content recognition information and displayed on the captured screen.

Mode of Disclosure

Terms used in this specification will now be briefly described before describing embodiments in detail.

Although the terms used in the disclosure have been described in general terms that are currently used in consideration of the functions referred to in the disclosure, they are intended to encompass various other terms depending on the intent of those of skill in the art, precedents, or the emergence of new technology. Accordingly, the terms used in the disclosure are not defined based on the meaning of the term, not on the name of a simple term, but on the contents throughout the disclosure.

It will be understood that the terms "comprises", "comprising", "includes" and/or "including", when used herein, specify the presence of stated elements, but do not preclude the presence or addition of one or more other elements. The term "unit" or "module" is used to denote an entity for performing at least one function or operation, and may be embodied as a software element or a hardware element or a combination of hardware and software.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. In the following description, for clarity, parts or elements that are not related to the embodiments are omitted.

FIG. 1 is a conceptual diagram for explaining a device 100 for recognizing content, according to an embodiment.

As shown in FIG. 1, the device 100 may be a TV, but this is merely an example and may be implemented in an electronic device that includes a display. For example, the device 100 may be implemented as a variety of electronic device such as a mobile phone, a tablet PC, a digital camera, a camcorder, a laptop computer, a tablet PC, a desktop, an electronic book terminal, a digital broadcasting terminal, a PDA (Personal Digital Assistants) Player, a PMP, navigation, an MP3 player, a wearable device, and the like. In particular, the embodiments may be easily implemented in a display device having a large display such as a TV, but are not limited thereto. Also, the device 100 may be a fixed or mobile type, and may be a digital broadcast receiver capable of receiving digital broadcasting.

The device 100 according to an embodiment may be provided with content through a content service that provides at least one content. For example, the device 100 may receive content from a content service providing device 10 that provides the content service. The content service providing device 10 according to an embodiment may be an external server or a device such as a set-top box. Also, the content service may include a real-time broadcast content service provided by a terrestrial broadcast, a cable broadcast set-top box, an IPTV set-top box, or the like, as well as a content service in the form of a web application such as Netflix and Youtube. However, the content service is not limited thereto.

Meanwhile, the device 100 according to an embodiment may identify a type of the content service when the content service is executed by the device 100. For example, the device 100 may identify the type of the content service by recognizing a set-top box that provides the content service. According to another example, the device 100 may identify the type of content service by recognizing a web application that is executed for the content service. According to another example, the device 100 may identify the type of the content service through an EPG (Electronic Program Guide) signal received together with the content.

The device 100 according to an embodiment may select a template corresponding to the identified type of the content service when the type of the content service is identified. Here, the template is used for recognizing the content, and may be a page having a layout corresponding to a gateway page including content recognition information such as a title and a genre of the content. Also, the gateway page may be, for example, a page displayed to provide information about the content to a user of the device 100 before the content is reproduced. Meanwhile, in this specification, a page may indicate a frame displayed on a screen of the device 100.

The device 100 according to an embodiment may capture a screen of the device 100 at a predetermined period when a control signal for controlling the content is received. The device 100 may compare a plurality of captured screens and detect a screen corresponding to a gateway page from among the plurality of screens. Also, the device 100 may compare the screen detected as the gateway page and the selected template to determine whether the detected screen corresponds to the selected template.

When the detected screen does not correspond to the selected template, the device 100 may generate the template corresponding to the detected screen. This will be described later in detail with reference to FIG. 2. The device 100 may detect the content recognition information from the detected screen using the generated template. Further, according to another example, when the detected screen corresponds to the selected template, the device 100 may detect the content recognition information from the detected screen based on the template. The device 100 may recognize the content displayed on the screen of the device 100 based on the detected content identification information.

Meanwhile, the device 100 may transmit information about the recognized content to an external server 200 that analyzes a user viewing pattern. The server 200 may analyze at least one user viewing pattern based on the information about the content received from at least one user device (e.g., 100). Here, the viewing pattern may include information about a channel and a kind of content preferred by the user and the like.

Figure 2:
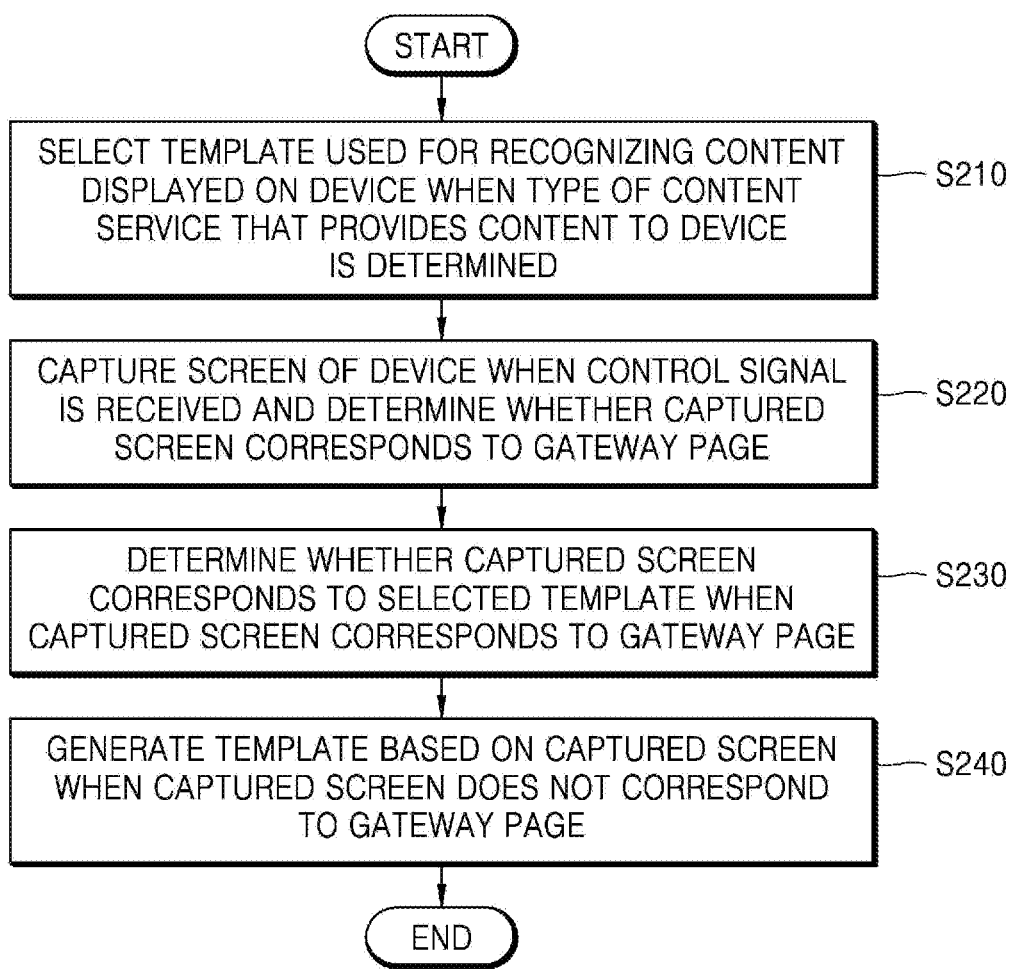
FIG. 2 is a flowchart for explaining a method, performed by a device, of recognizing content, according to an embodiment.

FIG. 2 is a flowchart for explaining a method, performed by the device 100, of recognizing content, according to an embodiment.

In operation S210, the device 100 selects a template used for recognizing content displayed on the device 100 when a type of the content service providing the content to the device 100 is determined.

The device 100 according to an embodiment may determine the type of content service that provides the content to the device 100. For example, the device 100 may recognize a logo of a set-top box displayed on a screen of the device 100 when the set-top box connected to the device 100 is turned on, to execute the content service. The device 100 may determine the type of the content service through the recognized logo. According to another example, when a web application is executed for execution of the content service in the device 100, the device 100 may recognize a type of the web application to be executed, thereby determining the type of the content service provided to the device 100.

According to another example, in the case of a terrestrial broadcast service, the device 100 may determine the type of the content service through an EPG signal received together with the content.

The device 100 according to an embodiment may select the template corresponding to the determined type of content service. The device 100 may store a template corresponding to each of at least one content service. For example, the device 100 may store a template corresponding to a first content service provided through an A web application and a template corresponding to a second content service provided through a B set-top box.

Meanwhile, according to another example, when the template corresponding to the determined type of content service is not stored in the device 100, the device 100 may select a predetermined basic template as the template corresponding to the determined type of the content service have. Here, the basic template may be set to one frame that does not include information. However, this is an embodiment only, and the device 100 may generate a flag indicating that the template is not stored when the template corresponding to the determined type of the content service is not stored.

In operation S220, when a control signal is received, the device 100 determines whether a captured screen corresponds to a gateway page including content identification information. Here, the content recognition information may include text that may identify a title, a genre, etc. of the content.

The device 100 according to an embodiment may receive the control signal for controlling at least one piece of content provided by the device 100. For example, the device 100 may receive the control signal for controlling the at least one content provided by the device 100 from an input device. However, this is only an embodiment, and according to another example, the device 100 may receive a control signal in the form of touch or gesture from a user. Here, the control signal may include one of a channel change signal of the device 100, a power on signal of the device 100, a connection signal between another device and the device 100, a menu selection signal of the device 100, and a request signal for at least one piece of content information.

The device 100 according to an embodiment may capture a screen of the device 100 in a predetermined time unit when the control signal is received. A plurality of screens captured by the device in the predetermined unit may include at least one of a screen in which a content control menu for content control is displayed, a screen in which a gateway page for introducing the content is displayed before the reproduction of specific content is started, and a content displayed screen.

The device 100 according to an embodiment may select a screen that satisfies a predetermined condition from among the plurality of screens as a screen corresponding to the gateway page. For example, the device 100 may compare the plurality of screens and select a previous screen of a screen from which a component including the content recognition information is removed.

In operation S230, the device 100 determines, based on a result of determination, whether the captured screen corresponds to the selected template.

The device 100 according to an embodiment may compare the captured screen with a layout of the selected template to determine whether the captured screen corresponds to the selected template. Here, the layout may represent a format in which components of at least one image unit included in the screen are arranged. For example, when the captured screen has a layout including a first image in the upper left and a second image in the lower right, the device 100 may determine whether the selected template also has the same layout as the captured screen.

In operation S240, when the captured screen does not correspond to the selected template, the device 100 generates a template corresponding to the content service based on the captured screen.

When the template corresponding to the determined type of content service is not stored in the device 100 according to an embodiment and a basic template is set or a flag is generated, the device 100 may determine that the captured screen does not match the selected template. Accordingly, the device 100 may generate the template based on the captured screen.

The device 100 according to an embodiment may generate the template having the layout corresponding to the captured screen. For example, the device 100 may generate the template in which a layout of default components is set in correspondence to a layout of components on the screen corresponding to the gateway page. Here, the default components may have size and shape corresponding to components included in the screen corresponding to the captured screen.

Meanwhile, the device 100 according to an embodiment may detect the content recognition information from the screen corresponding to the captured screen by comparing the generated template with the captured screen. For example, the device 100 may recognize a text region in which text is displayed from the captured screen and read text by applying OCR technology to the recognized text region, thereby recognizing the content displayed on the screen of the device 100.

Figure 3:
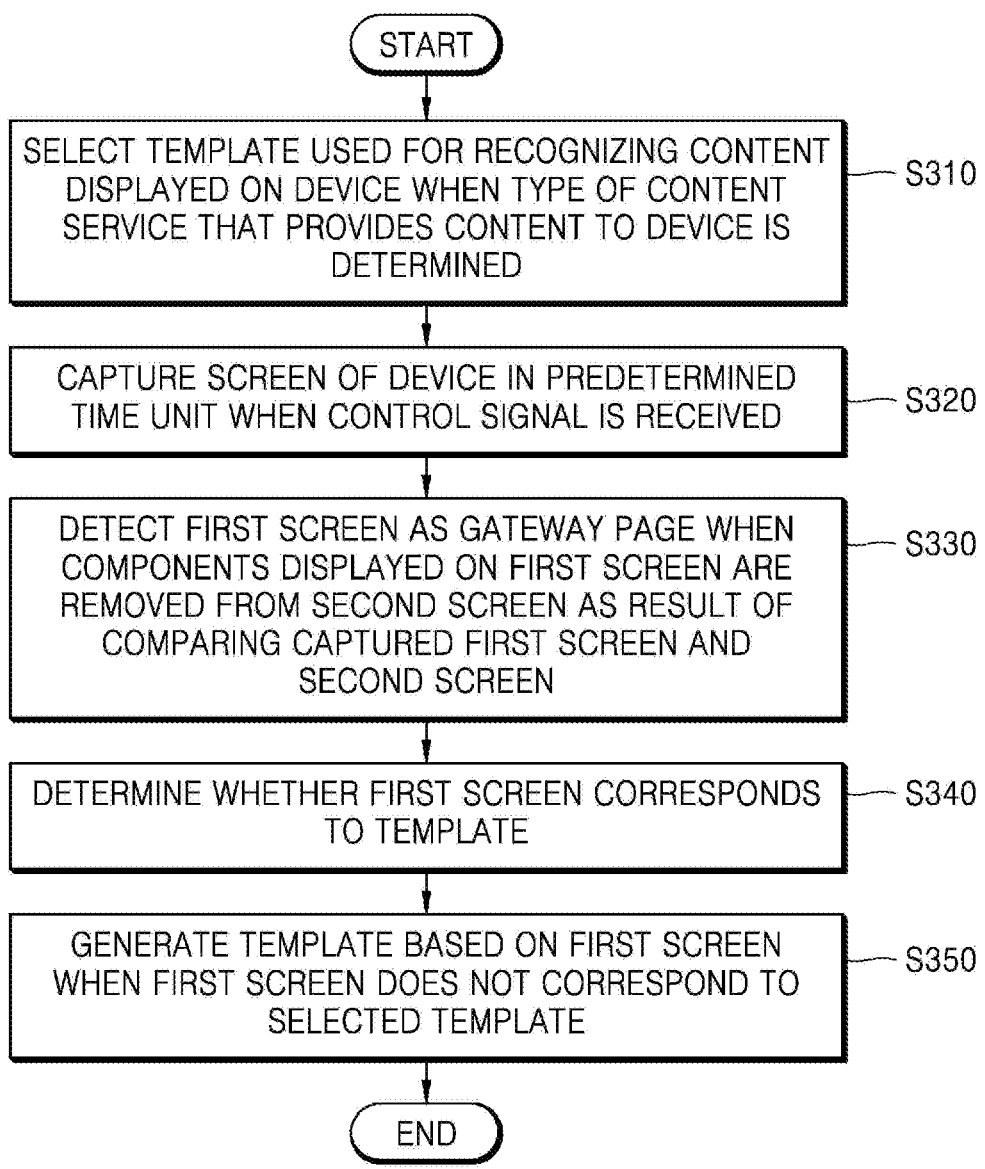
FIG. 3 is a flowchart for explaining a method, performed by a device, of detecting a gateway page, according to an embodiment.

FIG. 3 is a flowchart for explaining a method, performed by the device 100, of detecting a gateway page, according to an embodiment.

In operation S310, the device 100 selects a template used for recognizing content displayed on the device 100 when a type of the content service providing the content to the device 100 is determined.

Meanwhile, operation S310 may correspond to operation S210 described above with reference to FIG. 2.

In operation S320, the device 100 may capture a screen of the device 100 in a predetermined time unit when a control signal is received.

The device 100 may capture the screen of the device 100 on which the content is displayed at a predetermined period, to detect the gateway page. For example, when a user of the device 100 transmits the control signal to the device 100 to select any of a plurality of contents provided to the device 100, the device 100 may capture the screen of the device 100 in which the content is displayed at the predetermined period from a time when the control signal is received.

In operation S330, when a component displayed on a first screen is removed from a second screen as a result of comparing a captured first screen and a second screen, the device 100 may detect the first screen as the gateway page. Here, the component is at least part of information constituting the gateway page displayed before the content is reproduced, to provide information about the content. For example, the component may include an image box displaying text relating to a plot of the content, an image box displaying text relating to a title of the content, and an image box displaying text relating to a viewing rating of the content.

The device 100 according to an embodiment may compare a plurality of captured screens to select a previous screen of a screen on which the component is not displayed.

For example, the device 100 may compare the first screen captured at the time when the control signal is received and the second screen captured after a predetermined first time from the time when the control signal is received. The device 100 may detect the first screen as the gateway page when the component displayed on the first screen is not displayed on the second screen as a result of comparing the first screen and the second screen.

In operation S340, the device 100 may determine whether the first screen corresponds to the template.

The device 100 according to an embodiment may compare the first screen and a layout of the selected template to determine whether the first screen and the selected template correspond to each other.

In operation S350, when the first screen does not correspond to the selected template, the device 100 may generate the template based on the first screen.

Meanwhile, operation S350 may correspond to operation S240 described above with reference to FIG. 2.

Figure 4:
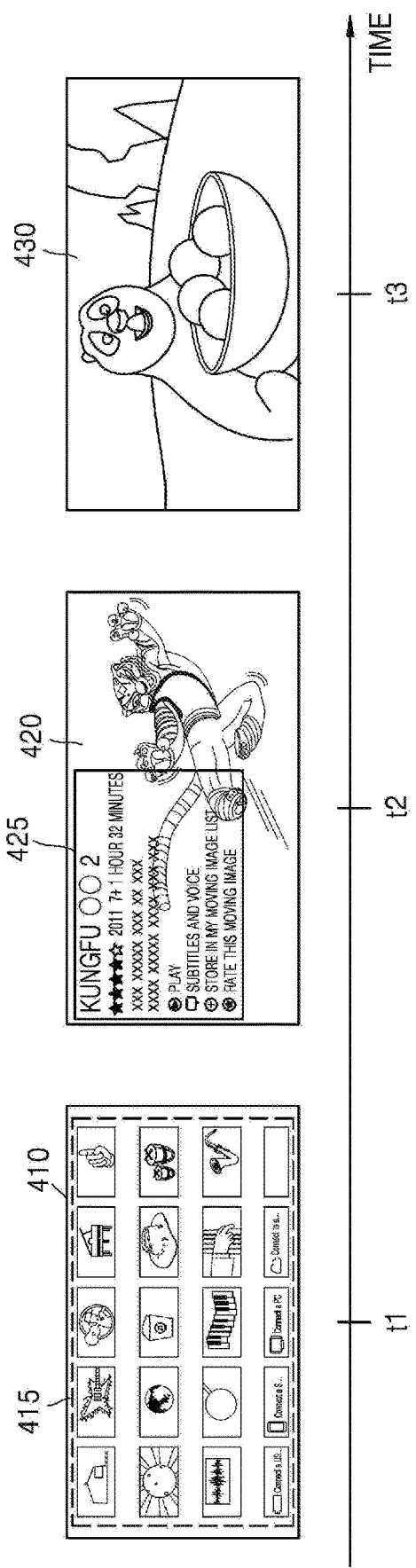
FIG. 4 is a diagram for explaining a method, performed by a device, of detecting a gateway page, according to an embodiment.

FIG. 4 is a diagram for explaining a method, performed by the device 100, of detecting a gateway page, according to an embodiment.

The device 100 according to an embodiment may receive a control signal at time t1 to select any one of a plurality of content provided to the device 100. The device 100 may capture a screen of the device 100 in which content is displayed in a predetermined time unit from the time t1 when the control signal is received. For example, the device 100 may capture the screen of the device 100 on which the content is displayed at time t1, t2, and t3, respectively. In FIG. 4, screens captured at the time t1, t2, and t3 will be described as a first screen 410, a second screen 420, and a third screen 430, respectively.

The device 100 according to an embodiment may compare the second screen 420 and the third screen 430 to detect the gateway page of the content. For example, when a component 425 displayed on the second screen 420 is removed from the third screen 430 as a result of comparing the first screen 410, the second screen 420, and the third screen 430, the device 100 may detect the second screen 420 as the gateway page.

Also, according to another example, as a result of comparing the first screen 410, the second screen 420, and the third screen 430, the device 100 may detect the second screen 420 captured before the third screen 430 from which a content control menu 415 displayed on the first screen 410 disappears and on which the content is displayed, as the gateway page. Here, the content control menu 415 may include a user interface for selecting any one of at least one piece of content provided from a content service.

Figure 5:
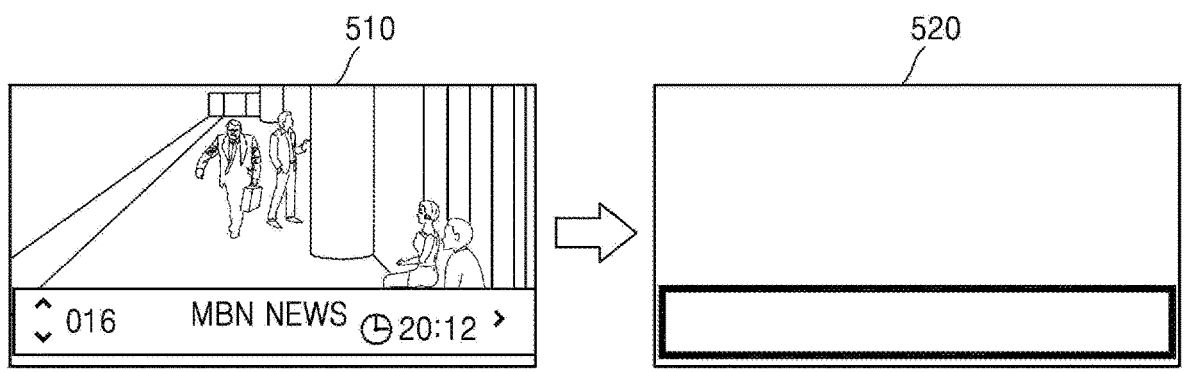
FIG. 5 is a diagram for explaining a first template generated by a device with respect to a content service, according to an embodiment.

FIG. 5 is a diagram for explaining a first template generated by the device 100 with respect to a content service, according to an embodiment.

The device 100 according to an embodiment may determine a type of the content service that provides content to the device 100. For example, the device 100 may determine the type of the content service by detect a logo of a set-top box displayed on a screen of the device 100 when the set-top box is powered on. According to another example, the device 100 may determine the type of the content service by determining a type of a web application to be executed in the device 100. According to another example, when a terrestrial broadcast service is received, the device 100 may detect an EPG (Electronic Program Guide) received together with the content and determine the type of the content service through the detected EPG.

Referring to FIG. 5, the device 100 may determine the type of the content service that the content service providing the content to the device 100 is a terrestrial TV broadcasting service when the EPG is received by the device 100. Accordingly, the device 100 may select a template corresponding to the terrestrial TV broadcasting service.

Meanwhile, the device 100 according to an embodiment may select a predetermined basic template when the template corresponding to the terrestrial TV broadcasting service is not stored in the device 100. However, this is an embodiment only, and the device 100 may set a flag indicating that the template corresponding to the terrestrial TV broadcast service is not stored in the device 100.

Also, the device 100 may capture a screen of the device 100 in a predetermined time unit from a time when a control signal is received when the control signal for selecting the content displayed on the device 100 is received. The device 100 according to an embodiment may compare a plurality of captured screens to detect a gateway page among the plurality of captured screens. Here, a method of detecting the gateway page may correspond to the method described above in FIG. 4.

The device 100 according to an embodiment may determine whether a detected screen 510 corresponds to the selected template. Meanwhile, the selected template is a basic template selected since the template corresponding to the terrestrial TV broadcasting service is not stored in the device 100, and thus the detected screen 510 may not correspond to the selected template in this embodiment. Further, according to another example, when the device 100 sets the flag indicating that the template corresponding to the terrestrial TV broadcast service is not stored in the device 100, the device 100 may determine, via the set flag, that the detected screen 510 does not correspond to the selected template.

Accordingly, the device 100 according to an embodiment may generate a first template 520 corresponding to the terrestrial TV broadcasting service based on the detected screen 510. For example, the device 100 may analyze a layout of the detected screen 510 to generate the first template 520 having a layout corresponding to the layout of the detected screen 510.

Meanwhile, the device 100 according to an embodiment may detect text corresponding to content recognition information from the detected screen 510 using the generated first template 520. The device 100 may recognize text displayed on the screen of the device 100 based on the detected text.

Figure 6:
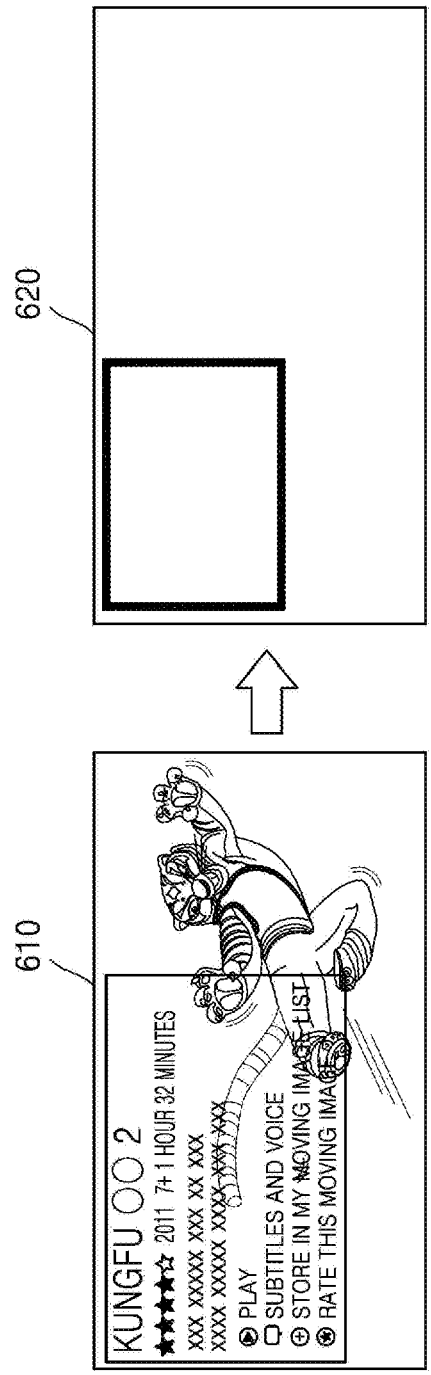
FIG. 6 is a diagram for explaining a second template generated by a device with respect to a content service, according to another embodiment.

FIG. 6 is a diagram for explaining a second template 620 generated by the device 100 with respect to a content service according to another embodiment.

Referring to FIG. 6, the device 100 may determine a type of the content service that the content service providing content to the device 100 is an A Web application service by identifying a web application that is running in the device 100. Accordingly, the device 100 may select a template corresponding to the A Web application service.

Meanwhile, the device 100 according to an embodiment may select a predetermined basic template when the template corresponding to the A Web application service is not stored in the device 100. However, this is an embodiment only, and the device 100 may set a flag indicating that the template corresponding to the A Web application service is not stored in the device 100.

Also, the device 100 may capture a screen of the device 100 in a predetermined time unit from a time when a control signal is received when the control signal for selecting the content displayed on the device 100 is received. The device 100 according to an embodiment may compare a plurality of captured screens to detect a gateway page from among the plurality of captured screens. Here, a method of detecting the gateway page may correspond to the method described above in FIG. 4.

The device 100 according to an embodiment may determine whether a detected screen 610 corresponds to the selected template. Meanwhile, since the selected template is a basic template selected when a template corresponding to a terrestrial TV broadcasting service is not stored in the device 100, the detected screen 610 may not correspond to the selected template in this embodiment. Further, according to another example, when the device 100 sets a flag indicating that the template corresponding to the terrestrial TV broadcast service is not stored in the device 100, the device 100 may determine, via the set flag, that the detected screen 610 does not correspond to the selected template.

Accordingly, the device 100 according to an embodiment may generate the second template 620 corresponding to the terrestrial TV broadcasting service based on the detected screen 610. For example, the device 100 may analyze a layout of the detected screen 610 and generate the second template 620 having a layout corresponding to the layout of the detected screen 610.

Meanwhile, the device 100 according to an embodiment may detect text corresponding to content recognition information from the detected screen 610 using the generated second template 620. The device 100 may recognize text displayed on the screen of the device 100 based on the detected text.

Figure 7:
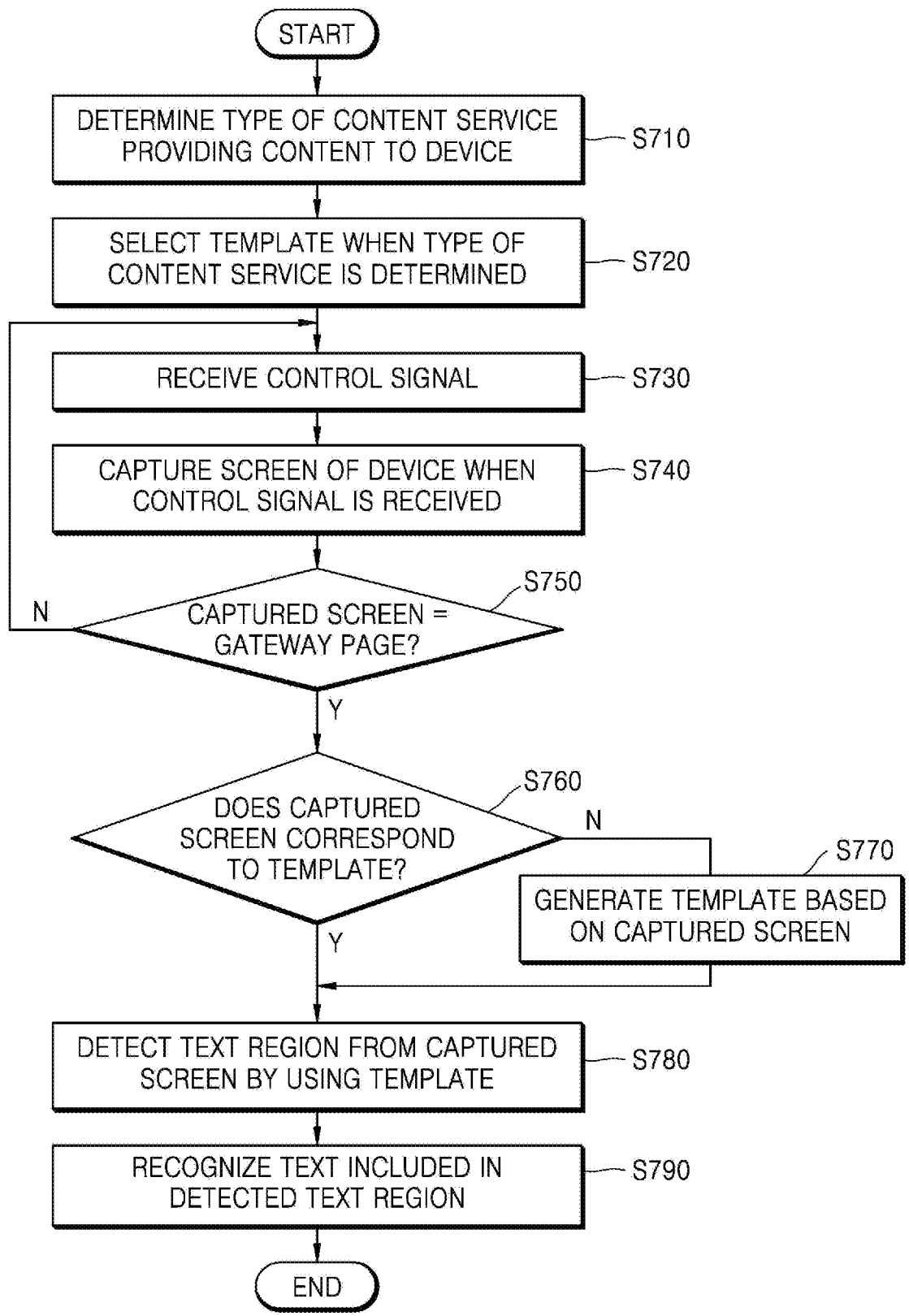
FIG. 7 is a flowchart for more specifically explaining a method, performed by a device, of recognizing content according to an embodiment.

FIG. 7 is a flowchart for more specifically explaining a method performed by the device 100 of recognizing content according to an embodiment.

In operation S710, the device 100 may determine a type of a content service that provides the content to the device 100. For example, the device 100 may recognize a logo A of a set-top box displayed on a screen of the device 100 when the set-top box connected to the device 100 is turned on. The device 100 may determine, via the recognized logo A, that the content service providing the content to the device 100 is an A content service provided from the A set-top box.

According to another example, the device 100 may detect this through metadata of a B web application when the B web application installed in the device 100 is executed. Accordingly, the device 100 may determine that the content service providing the content to the device 100 is a B content service provided via the B web application.

According to another example, when the device 100 detects an EPG signal to be provided to the device 100 in a base station transmitting a terrestrial broadcast, the device 100 may determine that the content service providing the content to the device 100 may be transmitted to a C content service that is one of a plurality of terrestrial broadcast services.

In operation S720, the device 100 may select a template when the type of the content service is determined.

The device 100 according to an embodiment may store a template corresponding to the type of the content service. When the type of the content service is determined, the device 100 may select the template corresponding to the determined type of the content service from the stored templates.

Meanwhile, when the device 100 does not store the template corresponding to the type of the content service, the device 100 may select a predetermined basic frame or generate a flag indicating that the template is not stored.

In operation S730, the device 100 may receive a control signal for controlling the content.

In operation S740, the device 100 may capture a screen of the device 100 in a predetermined time unit when the control signal is received.

In operation S750, the device 100 may determine whether the captured screen corresponds to a gateway page.

The device 100 according to an embodiment may compare a plurality of screens captured in the predetermined time unit and select a screen corresponding to the gateway page when the control signal is received. Meanwhile, a method performed by the device 100 of determining whether the captured screen corresponds to the gateway page may correspond to the method described above with reference to FIG. 3.

Meanwhile, when the screen corresponding to the gateway page is not present among the plurality of captured screens, the device 100 according to an embodiment may display the screen of the device 100 in a predetermined time unit from a time when another control signal is received.

In operation S760, the device 100 may determine whether the captured screen corresponds to the template.

The device 100 according to an embodiment may compare a layout of the template with a layout of the captured screen to determine whether the captured screen corresponds to the template.

In operation S770, the device 100 may generate a template based on the captured screen.

The device 100 according to an embodiment may generate the template based on the captured screen when the captured screen does not correspond to the template.

In operation S780, the device 100 may detect a text region from the screen captured using the template.

The device 100 according to an embodiment may detect the text region from the captured screen using the selected template when the layout of the selected template corresponds to the layout of the captured screen. Here, it is assumed that information about the text region is preset in the template.

Meanwhile, according to another embodiment, the device 100 may detect the text region from the captured screen by comparing the generated template with the captured screen.

In operation S790, the device 100 may recognize text included in the detected text region.

The device 100 according to an embodiment may recognize the text from the detected text region using a text reading technique such as OCR technology. The device 100 may extract text indicating a title and a genre of the content from the recognized text.

The device 100 according to an embodiment may recognize the content displayed on the screen of the device 100 based on the extracted text.

Figure 8:
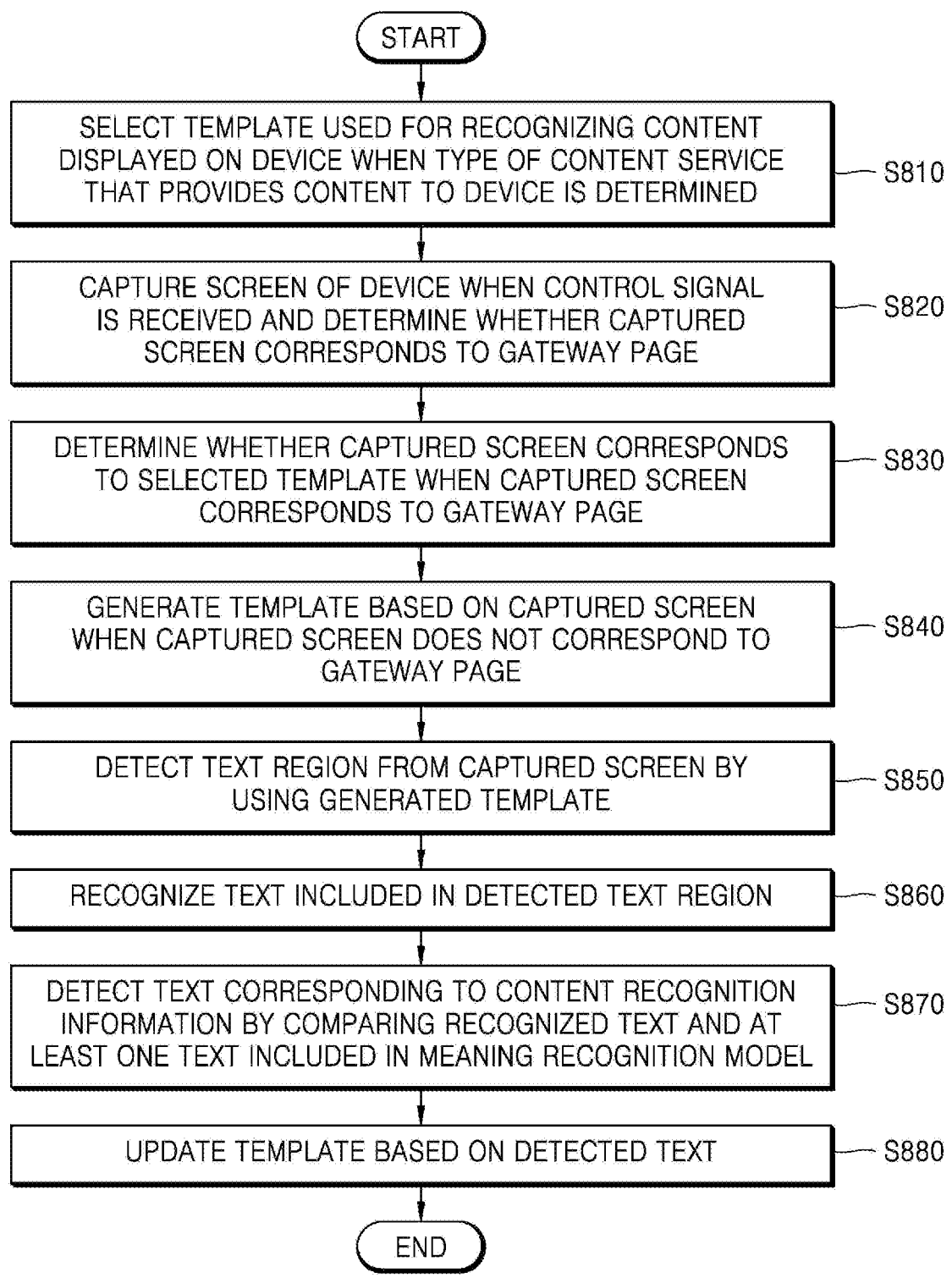
FIG. 8 is a flowchart for explaining a method, performed by a device, of detecting text corresponding to content recognition information using a meaning recognition model from a captured screen, according to an embodiment.

FIG. 8 is a flowchart for explaining a method performed by the device 100 of detecting text corresponding to content recognition information using a meaning recognition model from a captured screen according to an embodiment.

In operation S810, the device 100 may select a template to be used for recognizing content displayed on the device 100 when a type of a content service providing the content to the device 100 is determined.

Meanwhile, operation S810 may correspond to operation S210 described above with reference to FIG. 2.

In operation S820, the device 100 may capture a screen of the device 100 and determine whether the captured screen corresponds to a gateway page when a control signal is received.

Meanwhile, operation S820 may correspond to operation S220 described above with reference to FIG. 2.

In operation S830, the device 100 may determine whether the captured screen corresponds to the selected template when the captured screen corresponds to the gateway page.

Meanwhile, operation S830 may correspond to operation S230 described above with reference to FIG. 2.

In operation S840, when the captured screen does not correspond to the selected template, the device 100 may generate a template based on the captured screen.

Meanwhile, operation S840 may correspond to operation S240 described above with reference to FIG. 2.

In operation S850, the device 100 may detect a text region from the screen captured using the generated template.

In operation S860, the device 100 may recognize text included in the detected text region.

In operation S870, the device 100 may detect text corresponding to content recognition information by comparing the recognized text with at least one text included in the meaning recognition model.

The device 100 according to an embodiment may preset the meaning recognition model. The meaning recognition model may include at least one text for recognizing the content. For example, the meaning recognition model may include at least one text indicating a title of currently provided content and a channel name or number, etc., in which the content is being provided.

Further, according to another example, the meaning recognition model may be set differently according to an ID of the device 100 and an ID of a user. For example, when the user is a twenties female, the device 100 may select a meaning recognition model including at least one text indicating a title of content preferred by the twenties female and a channel type among a plurality of meaning recognition models.

The device 100 according to an embodiment may detect text included in a character string using a predetermined format pattern with respect to a template screen from the extracted character string. For example, when a format pattern indicating recognition information about content is set that the title name of the content is displayed next to the channel name, the device 100 may determine that text after the channel name corresponds to the title name of the content and detect the text after the channel name.

Meanwhile, according to another example, the at least one text included in the extracted character string may not correspond to a predetermined format pattern with respect the template. In this case, the device 100 may use a probability model that probabilistically calculates the relationship between texts representing recognition information about a plurality of pieces of contents provided by at least one content service stored in the meaning recognition model to detect the text indicating the content recognition information. For example, the device 100 may extract text that a name of an actor is A and a name of broadcast is B from a character string that A is a leading actor and B is an exclusive broadcast based on the probability model.

The device 100 according to another embodiment may read the extracted character string and compare the at least one text included in the extracted character string with at least one text included in a predetermined meaning recognition model. Here, the at least one text included in the meaning recognition model may be the text representing the content recognition information. The device 100 may extract the text corresponding to the predetermined meaning recognition model from the received character string by comparing the predetermined character recognition model with the received character string.

In operation S880, the device 100 may update the template based on the detected text.

The device 100 according to an embodiment may not perform reading on texts other than the detected text when the texts other than the detected text are not content recognition information. Thus, for example, the device 100 may recognize a location where the texts other than the detected text are displayed and remove a default component on a template corresponding to the recognized location. Also, according to another example, the device 100 may display an index indicating that text regarding the title of the content is detected, with respect to the default component disposed in a location where the text regarding the title of the content is detected, among at least on default components displayed on the template.

Figure 9:
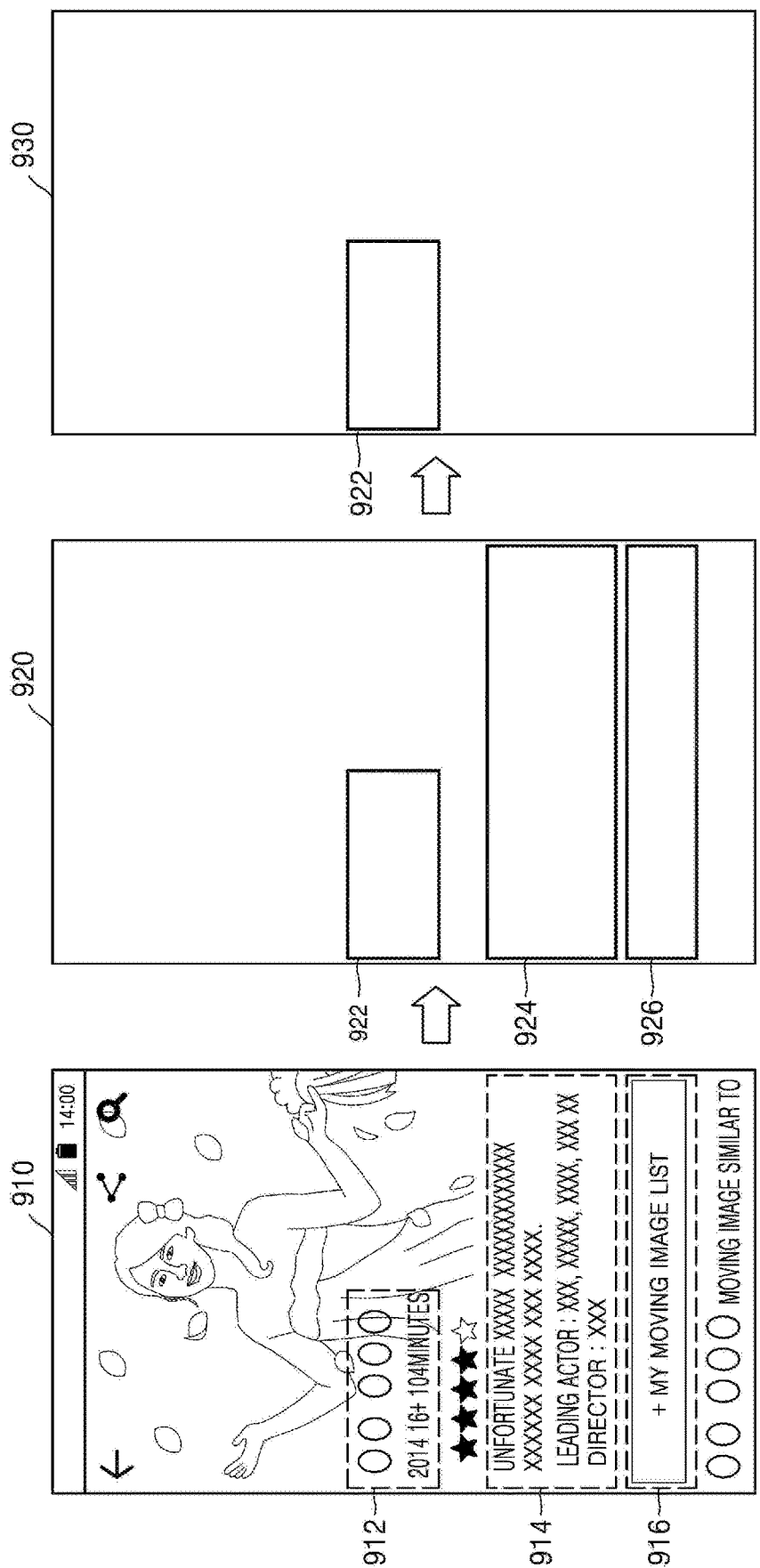
FIG. 9 is a diagram for explaining a method, performed by a device, of updating a generated template, according to an embodiment.

FIG. 9 is a diagram for explaining a method performed by the device 100 of updating a generated template according to an embodiment.

Referring to FIG. 9, the device 100 according to an embodiment may generate the template based on a captured screen 910 when the captured screen 910 is determined as a gateway page. In FIG. 9, it is assumed that the template selected by the device 100 does not correspond to the captured screen 910.

The device 100 according to an embodiment may extract at least one components 912, 914, and 916 from the captured screen 910 and generate a template 920 in which default components 922, 924, and 926 are disposed in locations corresponding to the extracted at least one components 912, 914, and 916.

Meanwhile, the device 100 according to an embodiment may update the generated template 920 by comparing the generated template 920 with recognition information of content detected from the detected gateway page 810. The device 100 may read text displayed on the captured screen 910 and select text including the content recognition information from the read text. The device 100 may also select the component 912 corresponding to the selected text and remove the components 924 and 926 excluding the default component 922 corresponding to the selected component 912 from among the default components 922, 924, 926 displayed in the template 920 and update the template 920.

Figure 10:
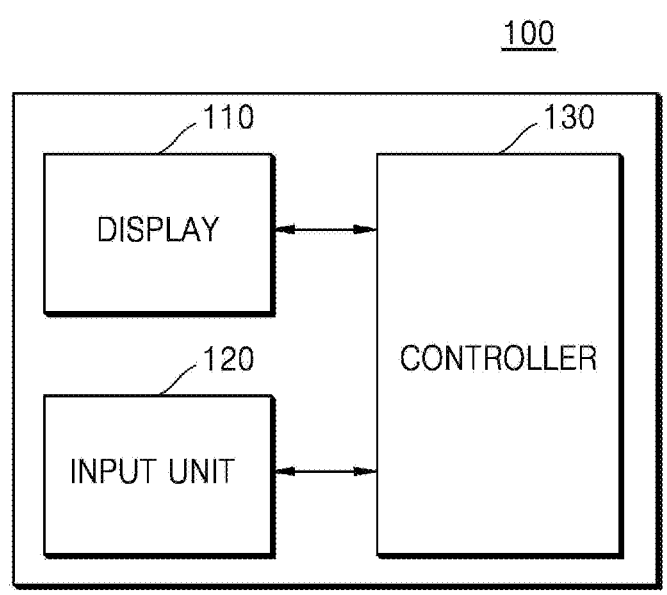
FIG. 10 is a block diagram of a device according to an embodiment.

FIG. 10 is a block diagram of the device 100 according to an embodiment.

Referring to FIG. 10, the device 100 according to an embodiment may include a display 110, an input unit 120, and a controller 130. However, not all illustrated components are indispensable components. The device 100 may be implemented by more or less components than the illustrated components.

The display 110 according to an embodiment displays content. For example, the display 110 may display the content received from an external content service providing apparatus.

The input unit 120 according to an embodiment receives a control signal for controlling the content.

The controller 130 according to an embodiment determines a type of a content service providing the content to the device 100. Also, the controller 130 selects a template used for recognizing content displayed on the device 100 when the type of the content service is determined. Meanwhile, when the template corresponding to the type of the content service is not stored in the device 100, the controller 130 may select a predetermined basic template as the template corresponding to the content service.

The controller 130 according to an embodiment captures a screen of the device 100 when a control signal is received and determines whether the captured screen corresponds to a gateway page. The controller 130 also determines whether the captured screen corresponds to the selected template when the captured screen corresponds to the gateway page as a result of determination. When the captured screen does not correspond to the selected template, the controller 130 generates the template corresponding to the content service based on the captured screen.

The controller 130 according to an embodiment may capture a screen of the device in a predetermined time unit from a time when the control signal is received. Also, the controller 130 may detect the gateway page by comparing a plurality of screens captured in the predetermined time unit. For example, when a component displayed on a first screen is removed from a second screen as a result of comparing the first screen and the second screen, the controller 130 may detect the first screen as the gateway page.

The controller 130 according to an embodiment may recognize a layout of components included in the captured screen. The controller 130 may generate a template in which default components corresponding to the components are displayed based on the recognized layout.

According to another embodiment, the controller 130 recognizes a text region on the captured screen. The controller 130 may generate a template including information about a position and arrangement of the recognized text region.

The controller 130 according to an embodiment may detect the text region from the captured screen using the generated template. The controller 130 may recognize the content displayed on the screen of the device 100 based on text detected from the detected text region.

The controller 130 according to an embodiment may detect text determined as content recognition information in the detected text by comparing the detected text with at least one text included in a predetermined meaning recognition model. Also, the controller 130 may update the template based on a position on which the detected text is displayed on the captured screen.

Figure 11:
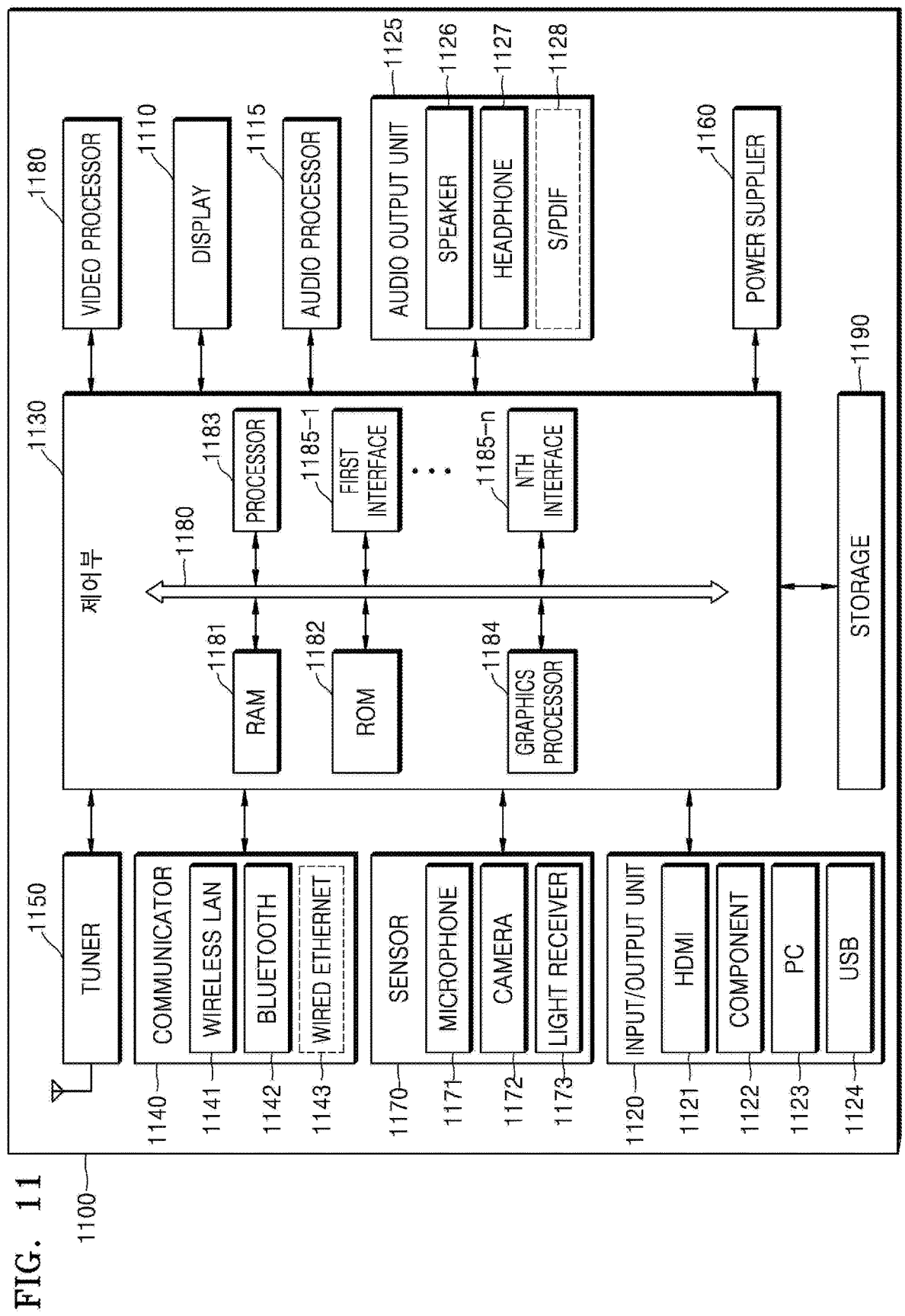
FIG. 11 is a block diagram of a device according to another embodiment.

FIG. 11 is a block diagram of a device 1100 according to another embodiment.

Referring to FIG. 11, the device 1100 according to an embodiment may further include an audio processor 1115, an audio output unit 1125, a communicator 1140, a tuner 1150, a power supplier 1160, a sensor 1170, a video processor 1180, and a storage 1190, in addition to a display 1110, an input/output unit 1120, and a controller 1130.

Hereinafter, the components will be described in order.

The display 1110 displays content provided to the device 1100 from a content service. Meanwhile, the display 1110 may correspond to the display 110 described with reference to FIG. 10 above.

The display 1110 converts an image signal, a data signal, an OSD signal, a control signal, etc. processed by the controller 1130 to generate driving signals. The display 1110 may be a PDP, an LCD, an OLED, a flexible display, or a 3D display. Also, the display 1110 may be configured as a touch screen and used as an input device in addition to an output device.

In the present specification, the display 1110 may be exchangeable with a screen in that the display 1110 displays the content.

The input/output unit 1120 receives video (e.g. a moving image, etc.), audio (e.g. voice, music, etc.), and additional information (e.g. EPG, etc.) from outside the device 1100 under the control of the controller 1130. The input/output unit 1120 according to an embodiment may receive a control signal for controlling the content displayed on the device 1100. The input/output unit 1120 may include one of a high-definition multimedia interface (HDMI) port 1121, a component jack 1122, a PC port 1123, and a USB port 1124. The input/output unit 1120 may include a combination of an HDMI port 1121, the component jack 1122, the PC port 1123, and the USB port 1124.

It will be readily understood by those of skill in the art that the configuration and operation of the input/output unit 1120 may be variously implemented according to the embodiments.

The controller 1130 usually controls the overall operation of the device 1100. For example, the controller 1130 may generally control the display 1110, an input/output unit 1120, the audio processor 1115, the audio output unit 1125, the communicator 1140, the tuner 1150, the power supplier 1160, the sensor 1170, the video processor 1180, and the storage 1190, and the like by executing programs stored in the storage 1190.

Meanwhile, the controller 1130 according to an embodiment may correspond to the controller 130 described with reference to FIG. 10 above.

The communicator 1140 may connect the device 1100 to an external device (for example, an input device, a service providing device, a server, or the like) under the control of the controller 1130. For example, the controller 1130 may transmit/receive content to/from a service providing device connected through the communicator 1140, download an application from the service providing device, or browse the web. The communicator 1140 may include one of a wireless LAN 1141, a Bluetooth 1142, and a wired Ethernet 1143 according to performance and structure of the device 1100. The communicator 1140 may also include a combination of the wireless LAN 1141, the Bluetooth 1142, and the wired Ethernet 1143. The communicator 1140 may receive the control signal for controlling the content under the control of the controller 130. The control signal may be implemented as a Bluetooth type control signal, an RF signal type control signal, or a WiFi type control signal. In this case, the communicator 1140 may perform a function corresponding to the function of the input/output unit 1120 described above.

The communicator 1140 may further include a near field communication (for example, near field communication (NFC), not shown) and a Bluetooth low energy (BLE) (not shown) other than Bluetooth.

The communicator 1140 may transmit extracted content recognition information to the server 200. The communicator 1140 may receive content viewing pattern information of a user of the device 1100 determined based on the content information extracted from the server 200.

The audio processor 1115 performs processing on audio data. The audio processor 1115 may perform various kinds of processing such as decoding and amplification, noise filtering, and the like on the audio data. Meanwhile, the audio processor 1115 may include a plurality of audio processing modules for processing audio corresponding to a plurality of contents.

The audio output unit 1125 outputs audio included in a broadcast signal received through the tuner 1150 under the control of the controller 1130. The audio output unit 1125 may output audio (e.g., voice or sound) input through the communicator 1140 or the input/output unit 1120. The audio output unit 1125 may also output audio stored in the storage 1190 under the control of the controller 1130. The audio output unit 1125 may include at least one of a speaker 1126, a headphone output terminal 1127, or a Sony/Philips Digital Interface (S/PDIF) output terminal 1128. The audio output unit 1125 may include a combination of the speaker 1126, the headphone output terminal 1127, and the S/PDIF output terminal 1128.

The tuner 1150 may receive the broadcast signal in a frequency band corresponding to a channel number (e.g., cable broadcast 506) according to a user input (e.g., for example, the control signal, a channel number input, a channel up-down input, and a channel input in an EPG screen).

The tuner 1150 may receive broadcast signals from various sources such as terrestrial broadcast, cable broadcast, satellite broadcast, internet broadcast, and the like. The tuner 1150 may receive a broadcast signal from a source such as an analog broadcast or a digital broadcast. The broadcast signal received through the tuner 1150 is decoded (for example, audio decoding, video decoding, or additional information decoding) and separated into audio, video and/or additional information. The separated audio, video, and/or additional information may be stored in the storage 1190 under the control of the controller 1130.

The tuner 1150 may tune and select only a frequency of a channel to be received by the display device 100 among many radio wave components through amplification, mixing, and resonance of a broadcast signal received by wired or wirelessly. The broadcast signal includes audio, video and additional information (for example, EPG (Electronic Program Guide)).

The power supplier 1160 supplies power from an external power source to internal components of the device 1100 under the control of the controller 1130. Also, the power supplier 1160 may supply power to the internal components from one or more batteries (not shown) located inside the device 1100 under the control of the controller 1130.

The sensor 1170 according to an embodiment may sense a user input and transmit a sensed signal to the controller 1130. Also, the sensor 1170 may sense user inputs for power on/off, channel selection, channel-up/down, and screen setup. Also, the sensor 1170 according to an embodiment may sense a user input for moving a cursor displayed on the display 1110 and a direction key input for moving a focus between candidate items. Also, the sensor 1170 senses a user's voice, an image of the user, or an interaction of the user.

A microphone 1171 receives a user's uttered voice. The microphone 1171 may convert the received voice into an electrical signal and output the electrical signal to the controller 1130.

The microphone 1171 may be implemented integrally with or separately from the device 100. The separated microphone 1171 may be electrically connected to the device 1100 through the communicator 1140 or the input/output unit 1120. It will be readily understood by those of skill in the art that the microphone 1171 may be omitted according to the performance and structure of the device 1100.

A camera 1172 may convert the received image into an electric signal under the control of the controller 1130 and output the electric signal to the controller 1130.

A light receiver 1173 receives an optical signal (including the control signal) received from an external input device through an optical window (not shown) of a bezel of the display 1110 or the like. The light receiver 1173 may receive the optical signal corresponding to a user input (e.g., touch, pressing, touch gesture, voice, or motion) from the input device. The control signal may be extracted from the received optical signal under the control of the controller 1130.

The video processor 1180 performs processing on video data received by the device 1100. The video processor 1180 may perform various kinds of image processing such as decoding, scaling, noise filtering, frame rate conversion, resolution conversion, and the like on the video data.

The controller 1130 may include a RAM 1181 that stores a signal or data input from the outside of the device 1100 or is used as a storage area corresponding to various jobs performed by the device 1100, an ROM 1182 in which a control program for controlling the device 1100 is stored, and a processor 1183.

The processor 1183 may include a graphic processing unit (not shown) for graphics processing corresponding to the video. The processor 1183 may be implemented as a SoC (System On Chip) incorporating a core (not shown) and a GPU (not shown). The processor 1183 may include a single core, a dual core, a triple core, a quad core, and multiple cores thereof.

The processor 1183 may also include a plurality of processors. For example, the processor 1183 may be implemented as a main processor (not shown) and a sub processor (not shown) operating in a sleep mode.

The graphics processor 1184 generates a screen including various objects such as an icon, an image, and a text using an operator (not shown) and a renderer (not shown). The operator calculates attribute values such as a coordinate value, a shape, a size, and a color to be displayed by each of the objects according to a layout of the screen using the user input sensed through the sensor 1170. The renderer generates screens of various layouts including the objects based on the attribute values calculated by the operator. The screens generated by the renderer are displayed within a display area of the display 1110.

First to nth interfaces 1185-1 to 1185-n are connected to the various components described above. One of the first to nth interfaces 1185-1 to 1185-n may be a network interface connected to an external device over a network.

The RAM 1181, the ROM 1182, the processor 1183, the graphics processor 1184 and the first through nth interfaces 1185-1 through 1185-n may be interconnected via an internal bus 1186.

The term controller in the present embodiment includes the processor 1183, the ROM 1182, and the RAM 1181.

The storage 1190 may store various data, programs, or applications for driving and controlling the device 1100 under the control of the controller 1130. For example, the storage 1190 may store a control program for controlling the device 1100 and the controller 1130, an application initially provided from a manufacturer or downloaded from outside, a graphical user interface (GUI) related to the application, objects (e.g., image text, icons, buttons, etc.) for providing the GUI, user information, documents, databases, or related data.

In an embodiment, the term storage includes a memory card (e.g., micro SD card, USB memory, not shown) installed in the storage 1190, the ROM 1182 and the RAM 1181 of the controller 1130, or the device 1100. Also, the storage 1190 may include a nonvolatile memory, a volatile memory, a hard disk drive (HDD), or a solid state drive (SSD).

The storage 1190 may include a broadcast receiving module, a channel control module, a volume control module, a communication control module, a voice recognition module, a motion recognition module, a light receiving module, a display control module, an audio control module, an external input control module, a power control module, a power control module of an external device connected wirelessly (e.g. Bluetooth), a voice database (DB), or a motion database (DB) that is not shown. The modules and database of the storage 1190 that are not shown may be implemented in the form of software to perform a control function of broadcast reception by the device 1100, a channel control function, a volume control function, a communication control function, a voice recognition function, a motion recognition function, a light reception control function, a display control function, an audio control function, an external input control function, a power control function, or a power control function of an external device connected wirelessly (e.g., Bluetooth). The controller 1130 may perform the respective functions using the software stored in the storage 1190.

The method according to an embodiment may be implemented as computer instructions which may be executed by various computer means, and recorded on a non-transitory computer-readable recording medium. The non-transitory computer-readable recording medium may include program instructions, data files, data structures, or a combination thereof. The program instructions recorded on the non-transitory computer-readable recording medium may be specially designed and constructed for the present disclosure or may be known to and usable by one of ordinary skill in a field of computer software. Examples of the non-transitory computer-readable medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program instructions, such as ROMs, RAMs, or flash memories. Examples of the program instructions include a high-level programming language that may be executed by a computer using an interpreter as well as a machine language code made by a compiler.

The device described herein may include a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media may be read by the computer, stored in the memory, and executed by the processor.

For the purposes of promoting an understanding of the principles of the disclosure, reference has been made to the embodiments illustrated in the drawings, and specific language has been used to describe these embodiments. However, no limitation of the scope of the disclosure is intended by this specific language, and the disclosure should be construed to encompass all embodiments that would normally occur to one of ordinary skill in the art.

The disclosure may be described in terms of functional block components and various processing steps. Such functional blocks may be realized by any number of hardware and/or software components configured to perform the specified functions. For example, the disclosure may employ various integrated circuit components, e.g., memory elements, processing elements, logic elements, look-up tables, and the like, which may carry out a variety of functions under the control of one or more microprocessors or other control devices. Similarly, where the elements of the disclosure are implemented using software programming or software elements, the disclosure may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the disclosure may employ any number of techniques of the related art for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the disclosure and are not intended to otherwise limit the scope of the disclosure in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the disclosure unless the element is specifically described as "essential" or "critical". It will be recognized that the terms "comprising," "including," and "having," as used herein, are specifically intended to be read as open-ended terms of art.

The use of the terms "the" and similar referents in the context of describing the disclosure (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. It will also be appreciated by those skilled in the art that various modifications, combinations, and alterations may be made depending on design criteria and factors within the scope of the appended claims or equivalents thereof.

The invention claimed is:

1. A method, performed by a device, of recognizing content, the method comprising:
  selecting a template used for recognizing content displayed by the device, based on a type of a content service that provides the content to the device;
  capturing at least a first screen of displayed content and a second screen of displayed content, based on the device receiving a control signal;
  comparing the captured first screen to the captured second screen to determine whether the captured first screen corresponds to a gateway page comprising content recognition information; and
  based on determining that the captured first screen corresponds to the gateway page:
    determining whether the captured first screen corresponds to the selected template;
    extracting content recognition information from the captured first screen using the selected template, based on determining that the captured first screen corresponds to the selected template; and
    generating a template corresponding to the content service, based on a layout of components included in the captured first screen, based on determining that the captured first screen does not correspond to the selected template.

2. The method of claim 1, wherein the generating of the template comprises:
  recognizing the layout of the components included in the captured first screen,
  wherein the generated template comprises default components corresponding to the components, based on the recognized layout.

3. The method of claim 1, wherein the generating of the template comprises:
  recognizing a text region included in the captured first screen,
  wherein the generated template comprises information about a position and arrangement of the recognized text region.

4. The method of claim 1, further comprising:
  determining the type of the content service that provides the content to the device,
  wherein the selecting of the template comprises:
    based on a template corresponding to the type of the content service not being stored in the device, selecting, as the template used for recognizing content, a predetermined template.

5. The method of claim 1, further comprising:
  detecting a text region from the captured first screen by using the generated template; and
  recognizing displayed content, based on text detected from the detected text region.

6. The method of claim 5, further comprising:
  detecting content recognition information from the detected text by comparing the detected text and at least one text included in a meaning recognition model.

7. The method of claim 6, further comprising:
  updating the generated template based on a display position of the content recognition information.

8. A device comprising:
  a display;
  an input device; and
  a processor configured to:
    select a template used for recognizing content displayed on the display, based on a type of the content service that provides the content to the device;

control to capture at least a first screen of displayed content and a second screen of displayed content, based on a control signal corresponding to an input to the input device;

compare the captured first screen to the captured second screen to determine whether the captured first screen corresponds to a gateway page comprising content recognition information; and based on determining that the captured first screen corresponds to the gateway page:
   determine whether the captured first screen corresponds to the selected template;
   extracting content recognition information from the captured first screen using the selected template, based on determining that the captured first screen corresponds to the selected template; and
   generate a template corresponding to the content service based on a layout of components included in the captured first screen, based on determining that the captured first screen does not correspond to the selected template.

9. The device of claim 8, wherein the processor is further configured to recognize the layout of the components included in the captured first screen,
   wherein the generated template comprises default components corresponding to the components, based on the recognized layout.

10. The device of claim 8, wherein the processor is further configured to recognize a text region included in the captured first screen,
   wherein the generated template comprises information about a position and arrangement of the recognized text region.

11. The device of claim 8, wherein the processor is further configured to:
   determine the type of the content service that provides the content to the device; and
   based on a template corresponding to the type of the content service not being stored in the device, select, as the template used for recognizing content, a predetermined template.

12. The device of claim 8, wherein the processor is further configured to:
   detect a text region from the captured first screen by using the generated templates; and
   recognize displayed content, based on text detected from the detected text region.

13. The device of claim 12, wherein the processor is further configured to detect content recognition information from the detected text by comparing the detected text and at least one text included in a meaning recognition model.

14. The device of claim 13, wherein the processor is further configured to update the generated template based on a display position of the content recognition information.

15. A non-transitory computer-readable recording medium on which a program for recognizing content is recorded, the program, when executed by a processor of an electronic device, causing the processor to control the electronic device to perform operations comprising:
   selecting a template used for recognizing content displayed by the device, based on a type of a content service that provides the content to the device;
   capturing at least a first screen of displayed content and a second screen of displayed content, based on the device receiving a control signal;
   comparing the captured first screen to the captured second screen to determine whether the captured first screen corresponds to a gateway page comprising content recognition information; and
   based on determining that the captured first screen corresponds to the gateway page:
      determining whether the captured first screen corresponds to the selected template;
      extracting content recognition information from the captured first screen using the selected template, based on determining that the captured first screen corresponds to the selected template; and
      generating a template corresponding to the content service, based on a layout of components included in the captured first screen, based on determining that the captured first screen does not correspond to the selected template.

* * * * *